United States Patent
Katayama et al.

(10) Patent No.: US 9,010,118 B2
(45) Date of Patent: Apr. 21, 2015

(54) OUTPUT CONTROLLER FOR STIRLING ENGINE

(75) Inventors: Masaaki Katayama, Susono (JP);
Manabu Tateno, Sunto-gun (JP);
Satoshi Komori, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 27 days.

(21) Appl. No.: 14/009,427

(22) PCT Filed: Apr. 4, 2011

(86) PCT No.: PCT/JP2011/058535
§ 371 (c)(1),
(2), (4) Date: Oct. 2, 2013

(87) PCT Pub. No.: WO2012/137287
PCT Pub. Date: Oct. 11, 2012

(65) Prior Publication Data
US 2014/0020376 A1 Jan. 23, 2014

(51) Int. Cl.
*F02G 3/00* (2006.01)
*F01B 29/10* (2006.01)
*F02G 1/047* (2006.01)
*F02G 1/06* (2006.01)
*F02G 5/04* (2006.01)

(52) U.S. Cl.
CPC *F02G 1/047* (2013.01); *F02G 1/06* (2013.01); *F02G 5/04* (2013.01); *F02G 2260/00* (2013.01); *F01P 2060/00* (2013.01); *F02G 2254/15* (2013.01); *Y02T 10/166* (2013.01)

(58) Field of Classification Search
CPC .............. F02G 1/047; F02G 5/04; F02G 1/06; F02G 2254/15; F02G 2260/00; Y02T 10/166; F01P 2060/00
USPC ..................... 60/614–616, 517, 524
See application file for complete search history.

(56) References Cited

U.S. PATENT DOCUMENTS

| 5,755,100 A * | 5/1998 | Lamos ............................ 60/521 |
| 6,543,229 B2 * | 4/2003 | Johansson .................... 60/605.1 |
| 7,181,912 B2 * | 2/2007 | Mori .............................. 60/616 |
| 2009/0094980 A1 | 4/2009 | Sawada et al. |

FOREIGN PATENT DOCUMENTS

| JP | 7-233758 | 9/1995 |
| JP | 2005-090376 A | 4/2005 |
| JP | 2005113719 A | 4/2005 |
| JP | 2005-248922 A | 9/2005 |
| JP | 2007-231857 A | 9/2007 |
| JP | 2008-051062 A | 3/2008 |

\* cited by examiner

*Primary Examiner* — Hoang Nguyen
(74) *Attorney, Agent, or Firm* — Kenyon & Kenyon LLP

(57) ABSTRACT

An output controller for a stirling engine is provided in a cooling system that causes common cooling water to flow through both the stirling engine and an internal combustion engine serving as a motive power source other than the stirling engine. The output controller for the stirling engine includes a temperature adjustment portion that adjusts a temperature of the cooling water supplied to the stirling engine. Specifically, the temperature adjustment portion includes a temperature adjustment valve capable of adjusting the temperature of the cooling water supplied to the stirling engine by switchably setting at least one of partial cooling paths and into a communication state.

4 Claims, 7 Drawing Sheets

OUTPUT CONTROLLER FOR STIRLING ENGINE

CROSS REFERENCE TO RELATED APPLICATION

This is a national phase application based on the PCT International Patent Application No. PCT/JP2011/058535 filed on Apr. 4, 2011, the entire contents of which are incorporated herein by reference.

TECHNICAL FIELD

The present invention relates to an output controller for a stirling engine, and more particularly, to an output controller for a stirling engine provided in a cooling system that causes a common cooling media to flow through both a stirling engine and a motive power source other than the stirling engine.

BACKGROUND ART

There is known a stirling engine for recovering exhaust heat. In this regard, for example, Patent Document 1 discloses a technique of the stirling engine itself. Also, for example, Patent Documents 2 and 3 disclose techniques to cause a common cooling medium to flow through an internal combustion engine and the stirling engine. Further, for example, Patent Document 4 discloses a technique to control output of the stirling engine for recovering the exhaust heat of the internal combustion engine.

PRIOR ART DOCUMENTS

Patent Documents

Patent Document 1: Japanese Patent Application Publication No. 2005-248922
Patent Document 2: Japanese Patent Application Publication No. 2005-90376
Patent Document 3: Japanese Patent Application Publication No. 2008-51062
Patent Document 4: Japanese Patent Application Publication No. 2007-231857

SUMMARY OF THE INVENTION

Problem to be Solved by the Invention

The stirling engine for recovering the exhaust heat is operated by use of the exhaust heat which a heater recovers from a high temperature heat source. In this regard, for example, it is conceivable to reduce the amount of heat transferred to the heater in order to suppress the output of the stirling engine when the output of the stirling engine is greater than the required output. However, as for the structure of the heater needing an appropriate heat capacity for recovering the exhaust heat, it is difficult to immediately reduce the temperature by a reduction in the transferred heat amount. In this case, it is difficult to reduce the output of the stirling engine with high responsiveness.

Also, in order to control the output of the stirling engine, for example, it is conceivable that an output shaft of the stirling engine is provided with a transmission or a clutch to change the rotational speed of the stirling engine. Thus, a change in the amount of working fluid exchanging heat conceivably controls the output. However, this case might lead to a complicated system. This might result in disadvantage in cost.

Also, in order to control the output of the stirling engine, for example, it is conceivable to vary the flow amount of the cooling medium supplied to the stirling engine. However, in this case of varying the flow amount, a limitation might arise in view of a structure that causes the common cooling medium to flow through both another motive power source (for example, internal combustion engine) and the stirling engine and in view of coolability of the other motive power source. As a result, the output control range of the stirling engine might be readily limited structurally.

The present invention takes the above problem into consideration and aims at providing an output controller for a stirling engine capable of preferably controlling output of the stirling engine causing a common cooling medium to flow through another motive power source.

Means for Solving the Problem

A first output controller for a stirling engine according to the present invention includes: the stirlinq engine; and a temperature adjustment portion provided in a cooling system that causes a common cooling media to flow through both the stirling engine and a motive power source other than the stirling engine, and the temperature adjustment portion adjusting a temperature of the cooling medium supplied to the stirling engine based on total output of output of the motive power source and output of the stirlinq engine or based on the output of the stirlinq engine, wherein the cooling system comprises: a radiator that cools the cooling medium having flowed through the motive power source; a first partial cooling path that supplies the stirling engine with the cooling medium having flowed through the radiator; and a second partial cooling path that supplies the stirling engine with the cooling medium after flowing through the motive power source before flowing through the radiator, and the temperature adjustment portion comprises a temperature adjusting valve capable of adjusting the temperature of the cooling medium supplied to the stirlinq engine by switchably setting at least one of the first and second partial cooling paths into a communication state.

A second output controller for a stirlinq engine according to the present invention includes: the stirling engine; and a temperature adjustment portion provided in a cooling system that causes a common cooling medium to flow through both the stirling engine and a motive power source other than the stirling engine, and the temperature adjustment portion adjusting a temperature of the cooling medium supplied to the stirling engine based on total output of output of the motive power source and output of the stirlinq engine or based on the output of the stirlinq engine, wherein the cooling system comprises a radiator that cools the cooling medium having flowed through the motive power source, and when the total output or the output of the stirling engine is greater than required output, the temperature adjustment portion supplies and retains the cooling medium, having flowed through the motive power source and having not flowed through the radiator yet, to and in the stirlinq engine.

The second output controller for the stirling engine can be structured so that the temperature adjustment portion comprises a stop valve provided at a downstream side of the stirling engine in the cooling system, and capable of retaining the cooling medium in the stirlinq engine by stopping a flow of the cooling medium.

A third output controller for a stirling engine according to the present invention includes: the stirling engine; and a temperature adjustment portion provided in a cooling system that causes a common cooling medium to flow through both the stirling engine and a motive power source other than the stirling engine, and the temperature adjustment portion adjusting a temperature of the cooling medium supplied to the stirling engine based on total output of output of the motive power source and output of the stirling engine or based on the output of the stirling engine, wherein the temperature adjustment portion comprises a heater capable of adjusting the temperature of the cooling medium supplied to the stirling engine by heating the cooling medium supplied to the stirling engine.

Effects of the Invention

The present invention is capable of preferably suppressing output of a stirling engine causing a common cooling medium to flow through another motive power source

EMBODIMENTS FOR CARRYING OUT THE INVENTION

Figure 1:
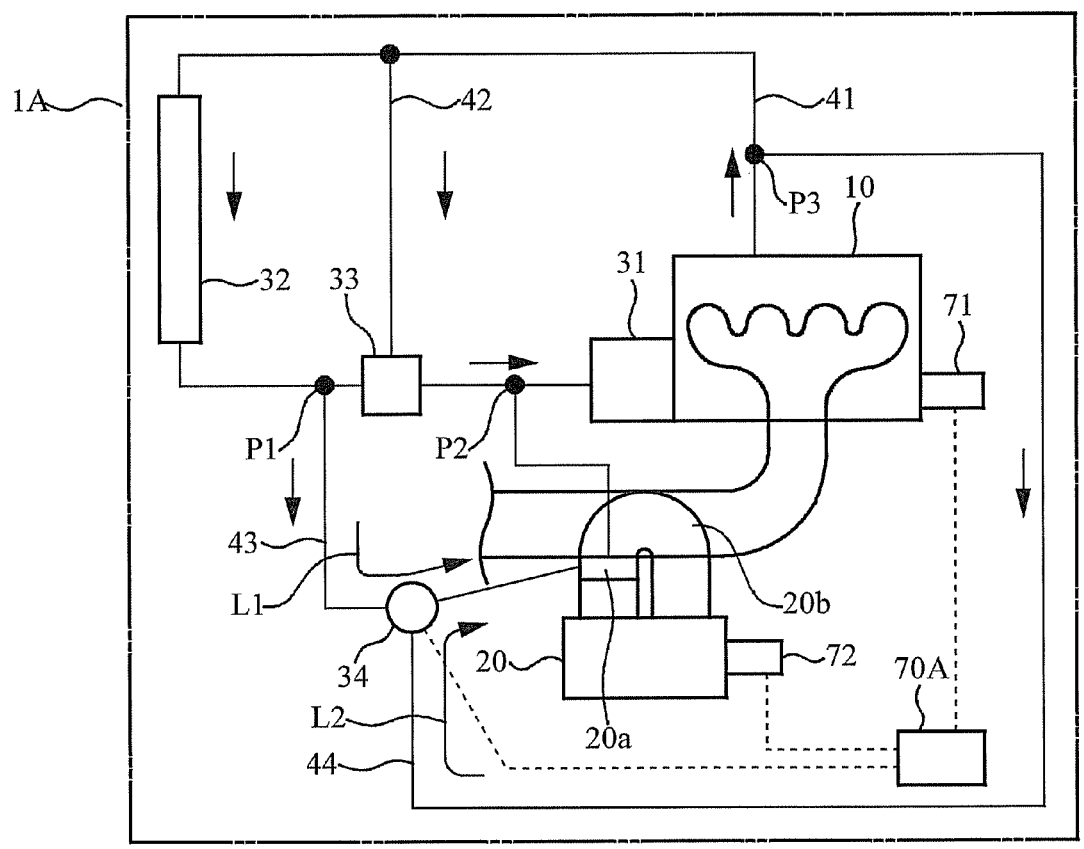
FIG. 1 is a diagram of a cooling system in accordance with the first embodiment.

Embodiments of the invention are now described by referring to the drawings.
First Embodiment
FIG. 1 is a diagram of a cooling system 1A. The cooling system 1A includes an internal combustion engine 10, a stirling engine 20, a pump 31, a radiator 32, a thermostat 33, and a temperature adjustment valve 34. Further, the cooling system 1A includes a main path portion 41, a bypass path portion 42, a branch path portion 43, and a high temperature path portion 44. These path portions 41 to 44 are pipes and foam a path causing cooling water as a cooling medium to flow. Arrows along the path portions 41 to 44 indicate the flow direction of the cooling water. The cooling system 1A causes the cooling water as a common cooling medium to flow through both the stirling engine 20 and the internal combustion engine 10 which is a motive power source other than the stirling engine 20.

The internal combustion engine 10 is a water-cooled internal combustion engine and permits the cooling water to flow therethrough. The pump 31 pumps the cooling water. The radiator 32 performs a heat exchange between the circulated cooling water and air to thus cool the cooling water. The thermostat 33 adjusts the temperature of the cooling water flowing through the internal combustion engine 10.

The internal combustion engine 10, the pump 31, the radiator 32, and the thermostat 33 are arranged on the main path portion 41. The main path portion 41 is a circulation path which causes the cooling water pumped by the pump 31 to flow through the internal combustion engine 10, the radiator 32, and the thermostat 33, in this order, and which returns the cooling water to the pump 31 afterward.

Thus, the pump 31 pumps the cooling water to the internal combustion engine 10. Also, the radiator 32 cools the cooling water having flowed through the internal combustion engine 10. Further, the main path portion 41 causes the cooling water to flow to the internal combustion engine 10 through the pump 31 from the radiator 32. The pump 31 is provided in the internal combustion engine 10, and is a mechanical pump driven by the power of the internal combustion engine 10. The pump 31 may be an electric pump.

The bypass path portion 42 is provided with the main path portion 41. The bypass path portion 42 forms a path that bypasses the radiator 32. Thus, the bypass path portion 42 causes the cooling water flowing through the internal combustion engine 10 to bypass the radiator 32.

The thermostat 33 is provided at the merging point of the main path portion 41 and the bypass path portion 42. Specifically, the thermostat 33 is a thermostat with a bypass valve capable of adjusting the temperature of the cooling water flowing to the internal combustion engine 10 by adjusting the rate of the flow amount of the cooling water flowing to the radiator 32 and the cooling water flowing to the bypass path portion 42.

When the thermostat 33 adjusts the rate of the flow amount of the cooling water, the thermostat 33 operates so as not to cause the cooling water to flow through the radiator 32 after the internal combustion engine 10 cold starts before the warm-up is finished, that is, before the temperature of the cooling water is suitable (for example, 80 degrees Celsius). Also, after the warm-up is finished, the radiator 32 operates to increase the rate of the flow amount of the cooling water that flows through the radiator 32 as the temperature of the cooling water that flows through the internal combustion engine 10 is high (for example, the load on the internal combustion engine 10 is high).

The branch path portion 43 is provided with the main path portion 41. The stirling engine 20 is provided on the branch path portion 43. The cross sectional area of the path formed by the branch path portion 43 is set smaller than that of the path formed by the main path portion 41. Specifically, the diameter of the path formed by the branch path portion 43 is set smaller than that of the path formed by the main path portion 41.

The branch path portion 43 branches off from the main path portion 41 in the first connection point P1, and can be merged with the second connection point P2 at the downstream side of the first connection point P1 of the main path portion 41 through the stirling engine 20. The connection points P1 and P2 are located between the radiator 32 and the pump 31 on the main path portion 41. On the other hand, the thermostat 33 is arranged between the connection points P1 and P2 on the main path portion 41. The thermostat 33 provided in such a way acts as the flow resistance to the cooling water that flows through the main path portion 41.

The stirling engine 20 is a stirling engine for recovering exhaust heat, and includes a refrigerator 20a and a heater 20b. The stirling engine 20 permits the cooling water to flow therethrough. Specifically, the cooling water flows through the refrigerator 20a. The refrigerator 20a performs the heat exchange between the cooling water and working fluid to cool the working fluid. On the other hand, the heater 20b performs the heat exchange between the working fluid and the exhaust gas from the internal combustion engine 10 to heat the working fluid.

In the stirling engine 20, the cooling water serves as a low temperature heat source of the stirling engine 20, and the exhaust gas serves as a high temperature heat source of the stirling engine 20. Therefore, the temperature difference between the low temperature heat source and the high temperature heat source can be made greater as the temperature of the cooling water that flows through the refrigerator 20a is made lower. Thus, the output of the stirling engine 20 (hereinafter, referred to as SE output) can be increased by reducing the temperature of the cooling water that flows through the refrigerator 20a.

The high temperature path portion 44 branches off from the main path portion 41, and is merged with the branch path portion 43. In this regard, the high temperature path portion 44 branches off from the main path portion 41 at the third connection point P3 between the downstream side of the internal combustion engine 10 and the upstream side of the radiator 32. Specifically, this portion is located at the upstream side of the branching portion into the bypass path portion 42 from the main path portion 41. The high temperature path portion 44 is merged with the branch path portion 43 at the upstream side of the stirling engine 20.

The temperature adjustment valve 34 is provided at the merging point of the branch path portion 43 and the high temperature path portion 44. The temperature adjustment valve 34 switchably sets at least one of the partial cooling paths L1 and L2 into the communication state. The first partial cooling path L1 supplies the stirling engine 20 with the cooling water having flowed through the radiator 32. The second partial cooling path L2 supplies the stirling engine 20 with the cooling water after flowing through the internal combustion engine 10 before flowing through the radiator 32.

In this regard, the first partial cooling path L1 of the branch path portion 43 is specifically located between the first connection point P1 and the stirling engine 20. Also, the second partial cooling path L2 of the branch path portion 43 and the high temperature path portion 44 is specifically located between the third connection point P3 and the stirling engine 20.

The cooling system 1A includes an ECU 70A. The ECU 70A is an electronic control apparatus provided with a microcomputer composed of a CPU, a ROM, and a RAM, and input/output circuits. The ECU 70A is electrically connected with the temperature adjustment valve 34 as a controlled object. The ECU 70A is electrically connected with an output detecting portion 71 capable of detecting the output of the internal combustion engine 10 (referred to as E/G output) and an output detecting portion 72 capable of detecting the SE output. The ECU 70A functionally realizes various means by executing the processes on the basis of the programs stored in the ROM while using a temporary memory area formed in the RAM as necessary. For example, the ECU 70A functionally realizes a first control portion as will be described below.

The first control portion controls the temperature adjustment valve 34. Specifically, the first control portion controls the temperature adjustment valve 34 on the basis of the total output of the E/G output and the SE output. Further, specifically, the first control portion determines the magnitude correlation between the total output and the required output on the basis thereof, and controls the temperature adjustment valve 34 on the basis of the determination result. In this regard, specifically, the first control portion controls the temperature adjustment valve 34 as follows.

Figure 2:
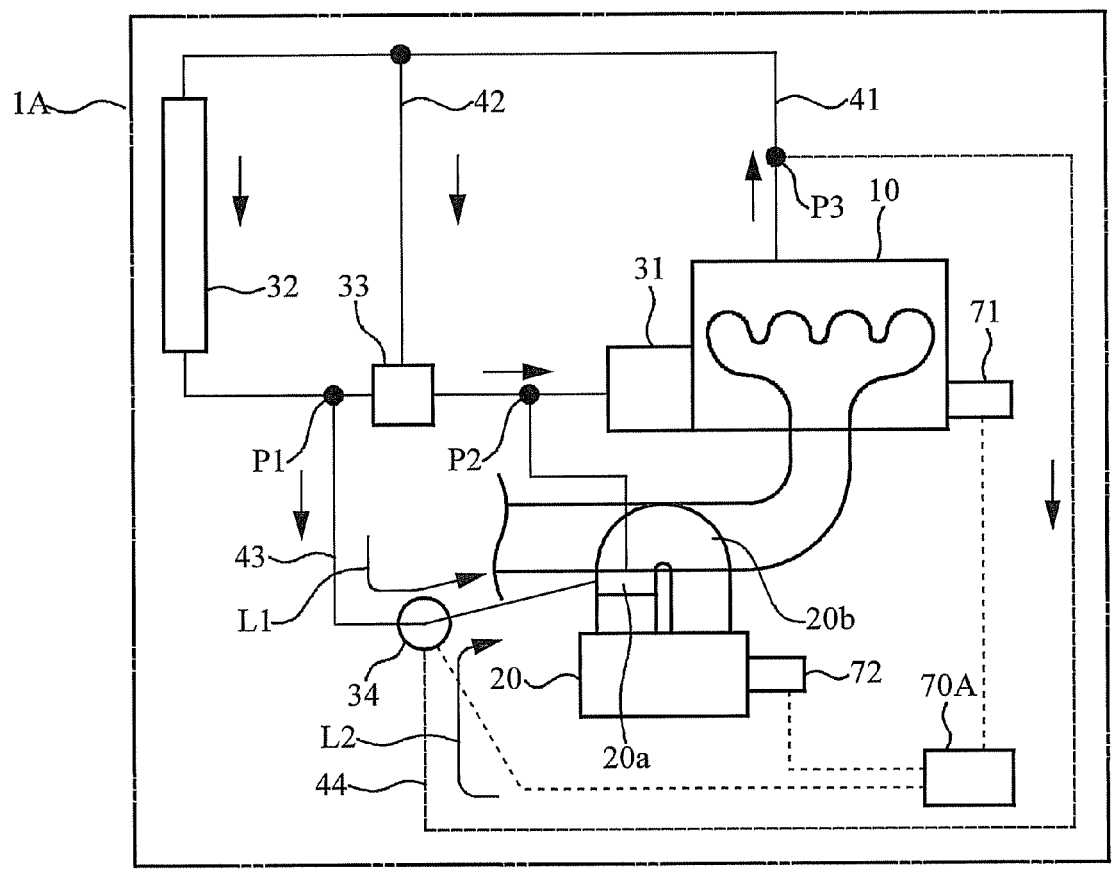
FIG. 2 is a diagram of the first control state of the cooling system in accordance with the first embodiment.
Figure 3:
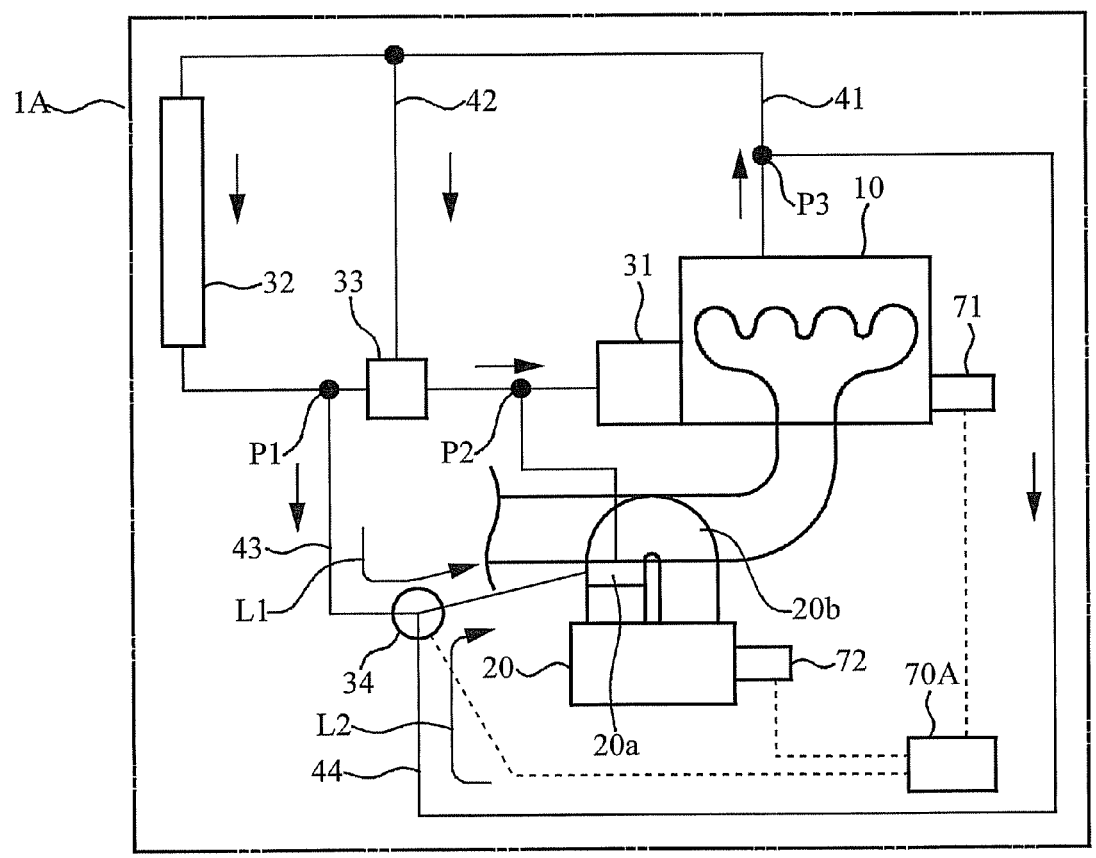
FIG. 3 is a diagram of the second control state of the cooling system in accordance with the first embodiment.
Figure 4:
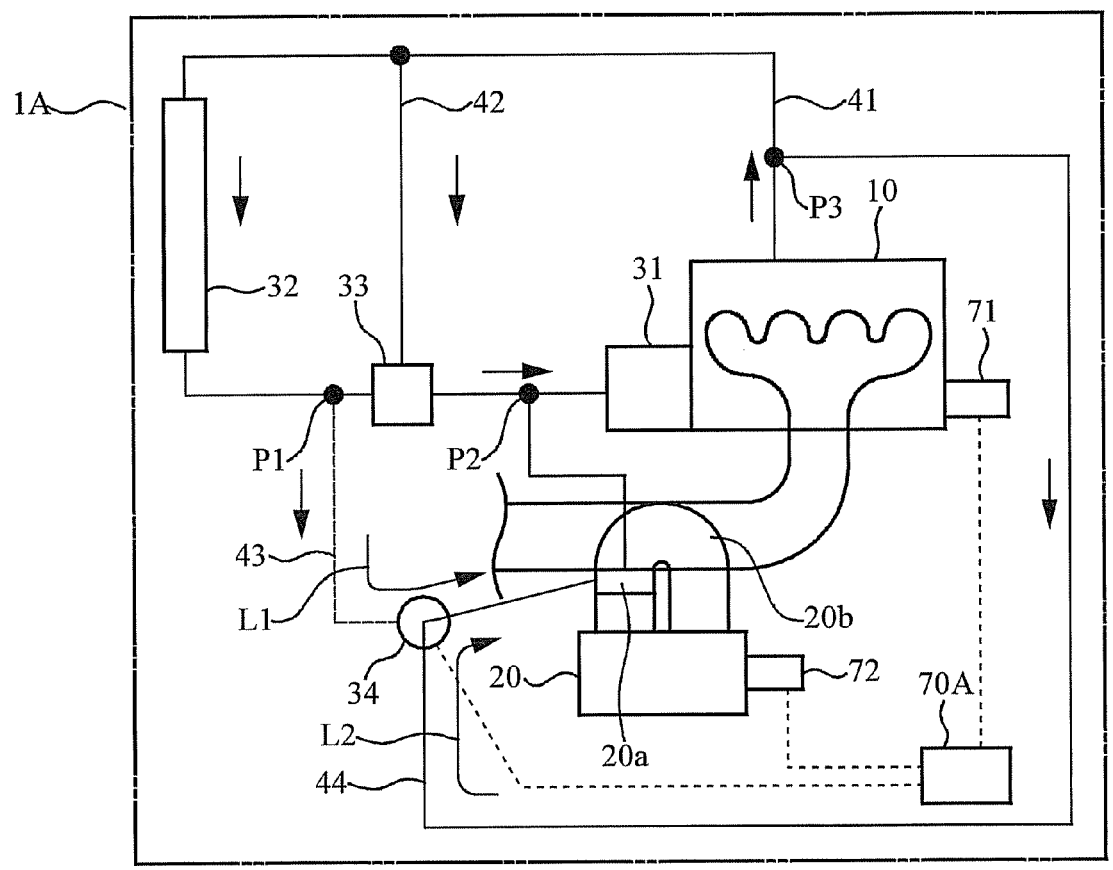
FIG. 4 is a diagram of the third control state of the cooling system in accordance with the first embodiment.

FIGS. 2 to 4 are diagrams of first, second, and third control states of the cooling system 1A. FIG. 2 illustrates the control state when the total output is smaller than the required output. FIG. 3 illustrates the control state when the total output is identical to the required output. FIG. 4 illustrates the control state when the total output is greater than the required output. In FIGS. 2 to 4, broken lines indicate the cooling water that stops flowing in the cooling path. FIGS. 2 to 4 also illustrate the communication state of the temperature adjustment valve 34.

When the total output is smaller than the required output, the first control portion controls the temperature adjustment valve 34 to set the first partial cooling path L1 into the communication state. In this case, the cooling water can be supplied to the stirling engine 20 through the first partial cooling path L1 as illustrated in FIG. 2. In this case, the internal combustion engine 10 is preferentially cooled and the cooling water having a relatively low temperature can be supplied to the stirling engine 20, so the SE output can be increased.

When the total output is identical to the required output, the first control portion controls the temperature adjustment valve 34 to communicate the partial cooling paths L1 and L2 with each other. In this case, the cooling water can be supplied to the stirling engine 20 through the partial cooling paths L1 and L2 as illustrated in FIG. 3. In this case, the SE output can be optimized by keeping the suitable temperature of the cooling water that is supplied to the stirling engine 20 in right temperature.

When the total output is greater than the required output, the first control portion controls the temperature adjustment valve 34 to set the second partial cooling path L2 into the communication state. In this case, the cooling water can be supplied to the stirling engine 20 through the second partial cooling path L2 as illustrated in FIG. 4. In this case, the SE output can be suppressed by supplying the stirling engine 20 with the cooling water having a relatively high temperature.

In such a way, the temperature adjustment valve 34 and the ECU 70A control the temperature of the cooling water that is supplied to the stirling engine 20. In this regard, the temperature adjustment valve 34 adjusts the temperature of the cooling water that is supplied to the stirling engine 20 by switchably setting at least one of the partial cooling paths L1 and L2 into the communication state. In the present embodiment, the temperature adjustment valve 34 and the ECU 70A achieve a temperature adjustment portion. Also, there is achieved the output controller for the stirling engine (hereinafter, referred to as output controller) that includes the temperature adjustment portion achieved by the temperature adjustment valve 34 and the ECU 70A.

Next, a description will be given of functions and effects of the output controller in accordance with the present embodiment. Herein, the cooling water exchanging heat in the refrigerator 20a has high density and high specific heat, as compared with the exhaust gas exchanging heat in the heater 20b. Also, the heat exchanger, like the refrigerator 20a, which performs the heat exchange between liquid and gas can perform the heat exchange more effectively than another heat exchanger, like the heater 20b, which performs the heat exchange between gasses.

In the output controller, the temperature adjustment portion adjusts the temperature of the cooling water that is supplied to the stirling engine 20. Thus, the output controller can control the SE output with high responsiveness, for example, as compared with a case of adjusting the flow amount of the exhaust gas that bypasses the heater 20b and flows outside thereof. Also, this structure can have an advantage in cost, for example, as compared with a case of providing a transmission or a clutch in the output shaft of the stirling engine 20. Further, this structure does not need varying the flow amount of the cooling water that is supplied to the stirling engine 20, so a wide control range of the SE output can be ensured, for example, as compared with a case of varying the flow amount of the cooling water that is supplied to the stirling engine 20. Furthermore, the SE output can be preferably controlled at these points.

In the output controller, the temperature adjustment portion adjusts the temperature of the cooling water supplied to the stirling engine 20 on the basis of the total output of the E/G output and the SE output. In other words, specifically, the output controller can control the SE output by adjusting the temperature of the cooling water supplied to the stirling engine 20 in such a way. This is preferable in a case of using the stirling engine 20 as a supporting power source of the internal combustion engine 10.

The output controller includes the temperature adjustment valve 34 that can adjust the temperature of the cooling water supplied to the stirling engine 20 by switchably setting at least one of the partial cooling paths L1 and L2 into the communication state. That is, in the output controller, the output control portion can be specifically structured to include such a temperature adjustment valve 34. In this case, the SE output can be finely controlled by appropriately supplying the stirling engine 20 with the cooling water having already flowed through the internal combustion engine 10 but having not flowed through the radiator 32 yet.

Second Embodiment

Figure 5:
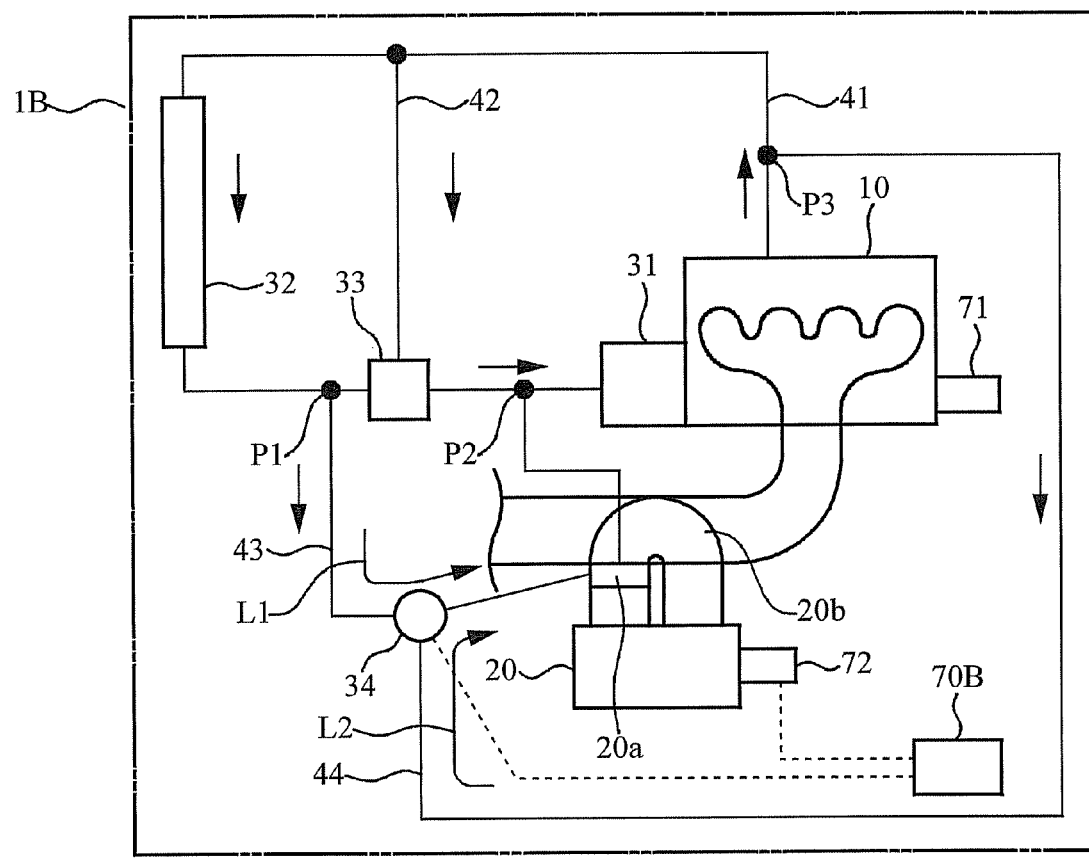
FIG. 5 is a diagram of a cooling system in accordance with the second embodiment.

FIG. 5 is a diagram of a cooling system 1B. The cooling system 1B is substantially the same as the cooling system 1A, except for providing an ECU 70B instead of the ECU 70A. The ECU 70B is substantially the same as the ECU 70A, except for achieving the first control portion as will be described below and being not electrically connected with the output detecting portion 71. In the ECU 70B, the first control portion controls the temperature adjustment valve 34 based on the SE output. Specifically, the first control portion determines the magnitude correlation between the SE output and the required output on the basis of the SE output and the required output, and controls the temperature adjustment valve 34 based on the determination result.

When the SE output is smaller than the required output, the first control portion controls the temperature adjustment valve 34 to set the first partial cooling path L1 into the communication state. In this case, the cooling water can be supplied to the stirling engine 20 through the first partial cooling path L1. In this case, the internal combustion engine 10 is preferentially cooled and the cooling water having a relatively low temperature can be supplied to the stirling engine 20, so the SE output can be increased.

When the SE output is identical to the required output, the first control portion controls the temperature adjustment valve 34 to communicate the partial cooling paths L1 and L2 with each other. In this case, the cooling water can be supplied to the stirling engine 20 through the partial cooling paths L1 and L2. In this case, the SE output can be optimized by keeping the suitable temperature of the cooling water that is supplied to the stirling engine 20 in right temperature.

When the SE output is greater than the required output, the first control portion controls the temperature adjustment valve 34 to set the second partial cooling path L2 to the communication state. In this case, the cooling water can be supplied to the stirling engine 20 through the second partial cooling path L2. In this case, the SE output can be suppressed by supplying the stirling engine 20 with the cooling water having a relatively high temperature.

In such a way, the temperature adjustment valve 34 and the ECU 70B controls the temperature of the cooling water that is supplied to the stirling engine 20. In the present embodiment, the temperature adjustment valve 34 and the ECU 70B achieve a temperature adjustment portion. Also, there is achieved the output controller that includes the temperature adjustment portion achieved by the temperature adjustment valve 34 and the ECU 70B.

Next, a description will be given of functions and effects of the output controller in accordance with the present embodiment. In the output controller in accordance with the present embodiment, the temperature adjustment portion controls the temperature adjustment valve 34 based on the SE output. In other words, specifically, the output controller in accordance with the present embodiment can control the SE output by adjusting the temperature of the cooling water supplied to the stirling engine 20 in such a way. This is preferable in a case of using the stirling engine 20 for a use other than a supporting power source of the internal combustion engine 10 (for example, driving of auxiliary machines). Additionally, except for the above points, the output controller has the same functions and effects as the output controller in accordance with the first embodiment.

Third Embodiment

Figure 6:
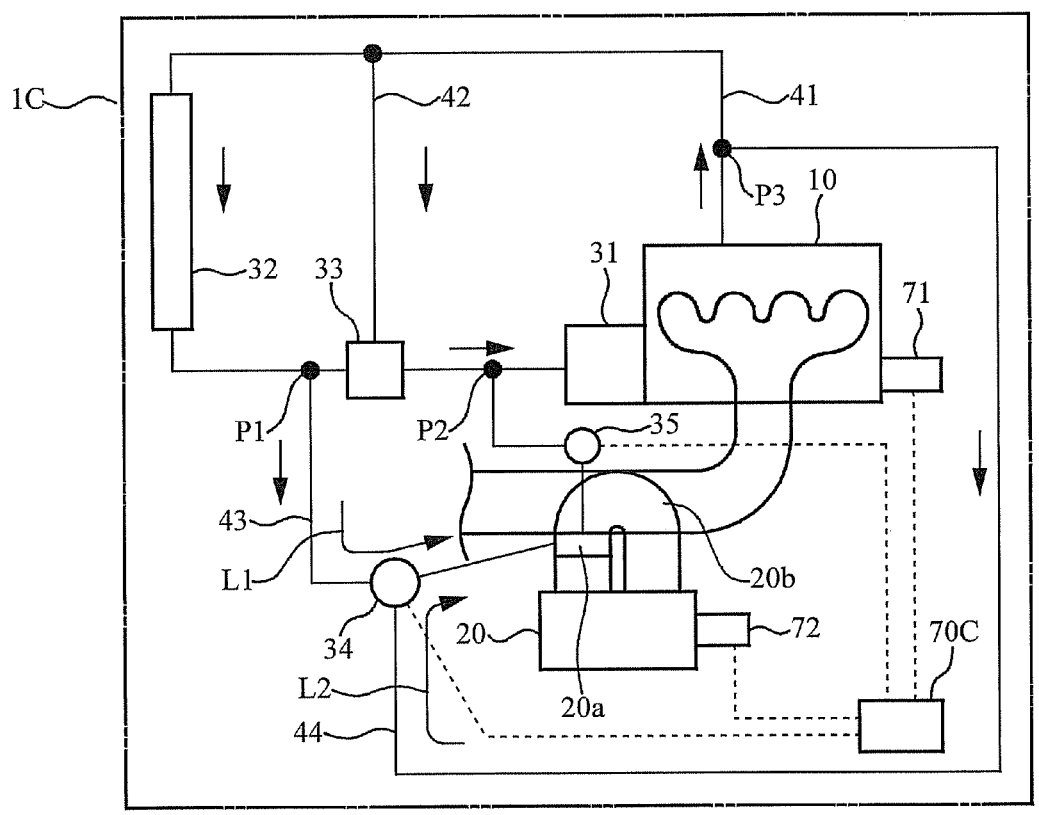
FIG. 6 is a diagram of a cooling system in accordance with the third embodiment.

FIG. 6 is a diagram of a cooling system 1C. The cooling system 1C is substantially the same as the cooling system 1A, except for further providing a stop valve 35 and providing an ECU 70C instead of the ECU 70A. A similar change is applicable to, for example, the cooling system 1B. The stop valve 35 is provided in the cooling system 1C at the downstream side of the stirling engine 20. The stop valve 35 is specifically provided on the branch path portion 43 at the downstream of the stirling engine 20. The stop valve 35 makes it possible to retain the cooling water in the stirling engine 20 by stopping a flow of the cooling water.

The ECU 70C is substantially the same as the ECU 70A, except for further achieving a second control portion as will be described below. The second control portion controls the stop valve 35. Specifically, the second control portion controls the stop valve 35 based on the total output of the E/G output and the SE output. When the total output is greater than the required output, the second control portion controls the stop valve 35 to stop the flow of the cooling water. In this regard, when the total output is equal to or smaller than the required output, the second control portion controls the stop valve 35 to permits the flow of the cooling water.

Specifically, when the total output is more than the required output even after the stirling engine 20 is supplied with the cooling water having already flowed through the internal combustion engine 10 and having not flowed through the radiator 32 yet, the second control portion can control the stop valve 35 to stop the flow of the cooling water. Additionally, in a case where a similar change is applied to the cooling system 1B, the second control portion can control the stop valve 35 based on the SE output instead of the total output.

Figure 7:
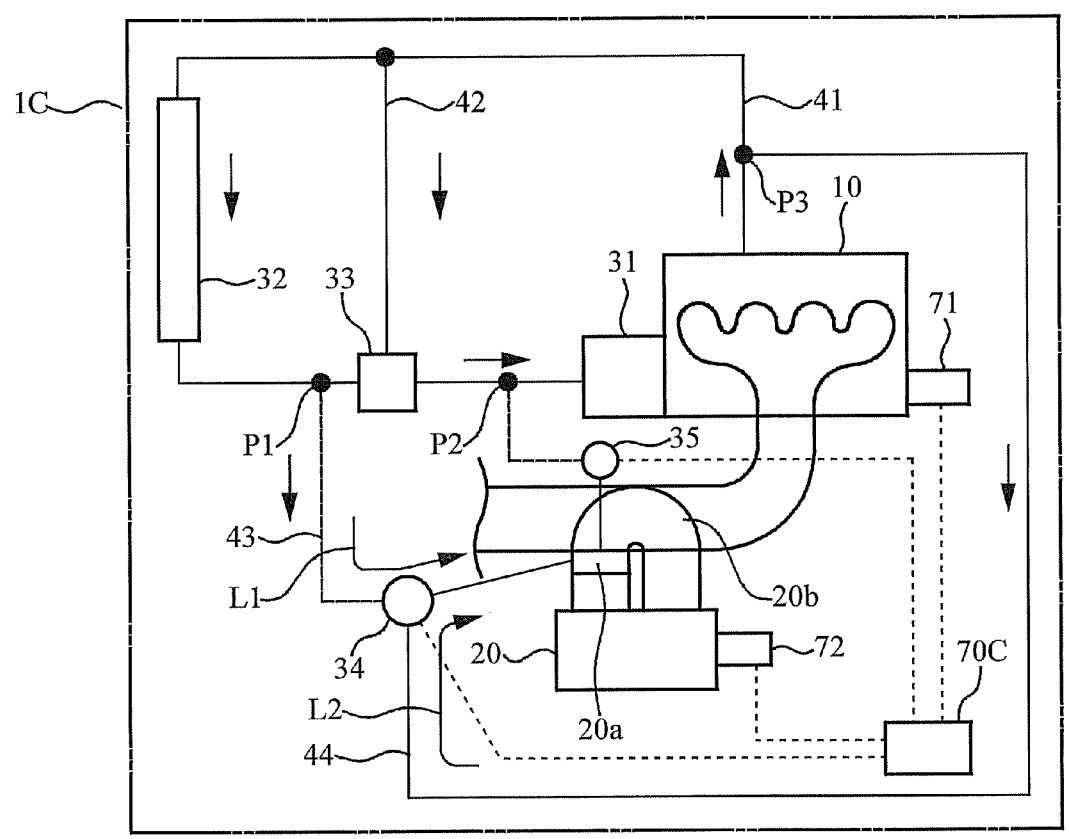
FIG. 7 is a diagram of the control state of the cooling system in accordance with the third embodiment.

FIG. 7 is a diagram of the control state of the cooling system 1C. FIG. 7 illustrates the control state of the cooling system 1C when the total output is greater than the required output. In this case, the temperature adjustment valve 34 is controlled to set the second partial cooling path L2 into the communication state, so the stirling engine 20 can be supplied with the cooling water having already flowed through the internal combustion engine 10 and having not flowed through the radiator 32 yet. Also, the cooling water can be retained in the stirling engine 20 by controlling the stop valve 35 to stop the flow of the cooling water.

In the present embodiment, the temperature adjustment portion is achieved by the temperature adjustment valve 34, the stop valve 35, and the ECU 70C. Also, there is achieved the output controller that includes the temperature adjustment portion achieved by the temperature adjustment valve 34, the stop valve 35, and the ECU 70C.

Next, a description will be given of functions and effects of the output controller in accordance with the present embodiment. In the output controller in accordance with the present embodiment, when the total output is greater than the required output, the temperature adjustment portion retains the cooling water, which has already flowed through the internal combustion engine 10 and which has not flowed through the radiator 32 yet, in the stirling engine 20. Therefore, in the output controller in accordance with the present embodiment, the SE output can be further suppressed and preferably controlled, for example, as compared with the first embodiment.

In this regard, when the total output is more than the required output even after the stirling engine 20 is supplied with the cooling water having already flowed through the internal combustion engine 10 and having not flowed through the radiator 32 yet, the temperature adjustment portion can retain the cooling water in the stirling engine 20. It is therefore possible to further reduce the total output, when the total output is more than the required output. Thus, the SE output can be preferably controlled.

In the output controller in accordance with the present embodiment, the temperature adjustment portion includes the stop valve 35 which is located at the downstream side of the stirling engine 20 and which can retain the cooling water in the stirling engine 20 by stopping the flow of the cooling water. That is, the output controller is specifically structured in such a way, enabling the cooling water to be retained in the stirling engine 20.

The present invention is not limited to the specifically described embodiments, but may include other embodiments and variations without departing from the scope of the claimed invention.

For example, the temperature adjustment portion may be provided with a heater that heats the cooling supplied to the stirling engine. In this case, for example, in the first embodiment, instead of providing the temperature adjustment valve 34 and the high temperature path portion 44, the heater is provided on the branch path portion 43 at the upstream side of the stirling engine 20, enabling the cooling supplied to the stirling engine 20 be heated. This makes it possible to adjust the temperature of the cooling water supplied to the stirling engine 20.

In this case, for example, the temperature adjustment portion can adjust the temperature of the cooling water supplied to the stirling engine on the basis of the total output of the E/G output and the SE output, or on the basis of the SE output In this regard, specifically, the temperature adjustment portion can be structured to include a heater control portion that controls the heater on the basis of the total output of the E/G output and the SE output, or on the basis of the SE output For example, the heater control portion can operate the heater, when the total output or the SE output is greater than the required output.

DENOTATION OF REFERENCE NUMERALS cooling system 1A, 1B, 1C
internal combustion engine 10
stirling engine 20
pump 31
radiator 32
thermostat 33
temperature adjustment valve 34
stop valve 35
main path portion 41
bypass path portion 42
branch path portion 43
high temperature path portion 44
ECU 70A, 70B, 70C

The invention claimed is:

1. An output controller for a stirling engine, comprising the stirling engine; and
a temperature adjustment portion provided in a cooling system that causes a common cooling medium to flow through both the stirling engine and a motive power source other than the stirling engine, and the temperature adjustment portion adjusting a temperature of the cooling medium supplied to the stirling engine based on total output of output of the motive power source and output of the stirling engine or based on the output of the stirling engine,
wherein the cooling system comprises:
a radiator that cools the cooling medium having flowed through the motive power source;
a first partial cooling path that supplies the stirling engine with the cooling medium having flowed through the radiator;
and a second partial cooling path that supplies the stirling engine with the cooling medium after flowing through the motive power source before flowing through the radiator, and
the temperature adjustment portion comprises a temperature adjusting valve capable of adjusting the temperature of the cooling medium supplied to the stirling engine by switchably setting at least one of the first and second partial cooling paths into a communication state.

2. An output controller for a stirling engine, comprising the stirling engine; and
a temperature adjustment portion provided in a cooling system that causes a common cooling medium to flow through both the stirling engine and a motive power source other than the stirlinq engine, and the temperature adjustment portion adjusting a temperature of the cooling medium supplied to the stirlinq engine based on total output of output of the motive power source and output of the stirlinq engine or based on the output of the stirlinq engine,
wherein the cooling system comprises a radiator that cools the cooling medium having flowed through the motive power source, and
when the total output or the output of the stirling engine is greater than required output, the temperature adjustment portion supplies and retains the cooling medium, having flowed through the motive power source and having not flowed through the radiator yet, to and in the stirlinq engine.

3. The output controller for the stirling engine of claim 2, wherein
the temperature adjustment portion comprises a stop valve provided at a downstream side of the stirlinq engine in the cooling system, and capable of retaining the cooling medium in the stirlinq engine by stopping a flow of the cooling medium.

4. An output controller for a stirling engine comprising the stirling engine; and
a temperature adjustment portion provided in a cooling system that causes a common cooling medium to flow through both the stirling engine and a motive power source other than the stirling engine, and the temperature adjustment portion adjusting a temperature of the cooling medium supplied to the stirling engine based on total output of output of the motive power source and output of the stirling engine or based on the output of the stirling engine, wherein the temperature adjustment portion comprises a heater capable of adjusting the temperature of the cooling medium supplied to the stirling engine by heating the cooling medium supplied to the stirling engine.

* * * * *

UNITED STATES PATENT AND TRADEMARK OFFICE
CERTIFICATE OF CORRECTION

PATENT NO. : 9,010,118 B2  
APPLICATION NO. : 14/009427  
DATED : April 21, 2015  
INVENTOR(S) : M. Katayama et al.

Page 1 of 1

It is certified that error appears in the above-identified patent and that said Letters Patent is hereby corrected as shown below:

IN THE SPECIFICATION

At column 2, line 24, change "the stirlinq engine" to -- the stirling engine --.

At column 2, line 31, change "output of the stirlinq engine" to -- output of the stirling engine --.

At column 2, line 32, change "output of the stirlinq engine" to -- output of the stirling engine --.

At column 2, line 42, change "supplied to the stirlinq engine" to -- supplied to the stirling engine --.

At column 2, line 45, change "for a stirlinq engine" to -- for stirling engine --.

At column 2, line 53, change "the stirlinq engine" to -- the stirling engine --.

At column 2, line 54, change "the stirlinq engine" to -- the stirling engine --.

At column 2, line 61, change "the stirlinq engine" to -- the stirling engine --.

At column 2, line 66, change "the stirlinq engine" to -- the stirling engine --.

At column 3, line 1, change "the stirlinq engine" to -- the stirling engine --.

At column 3, line 2, change "the stirlinq engine" to -- the stirling engine --.

At column 3, line 9, change "the stirlinq engine" to -- the stirling engine --.

At column 3, line 10, change "the stirlinq engine" to -- the stirling engine --.

IN THE CLAIMS

At column 10, line 38, in Claim 2, change "the stirlinq engine" to -- the stirling engine --.

At column 10, line 40, in Claim 2, change "the stirlinq engine" to -- the stirling engine --.

At column 10, line 42, in Claim 2, change "the stirlinq engine" to -- the stirling engine --.

At column 10, line 42, in Claim 2, change "the stirlinq engine" to -- the stirling engine --.

At column 10, line 51, in Claim 2, change "the stirlinq engine" to -- the stirling engine --.

At column 10, line 56, in Claim 3, change "the stirlinq engine" to -- the stirling engine --.

At column 10, line 58, in Claim 3, change "the stirlinq engine" to -- the stirling engine --.

Signed and Sealed this  
First Day of December, 2015

Michelle K. Lee  
*Director of the United States Patent and Trademark Office*